No. 881,313. PATENTED MAR. 10, 1908.
A. P. FINLEY.
COMPOUND RAILWAY RAIL.
APPLICATION FILED AUG. 20, 1907.
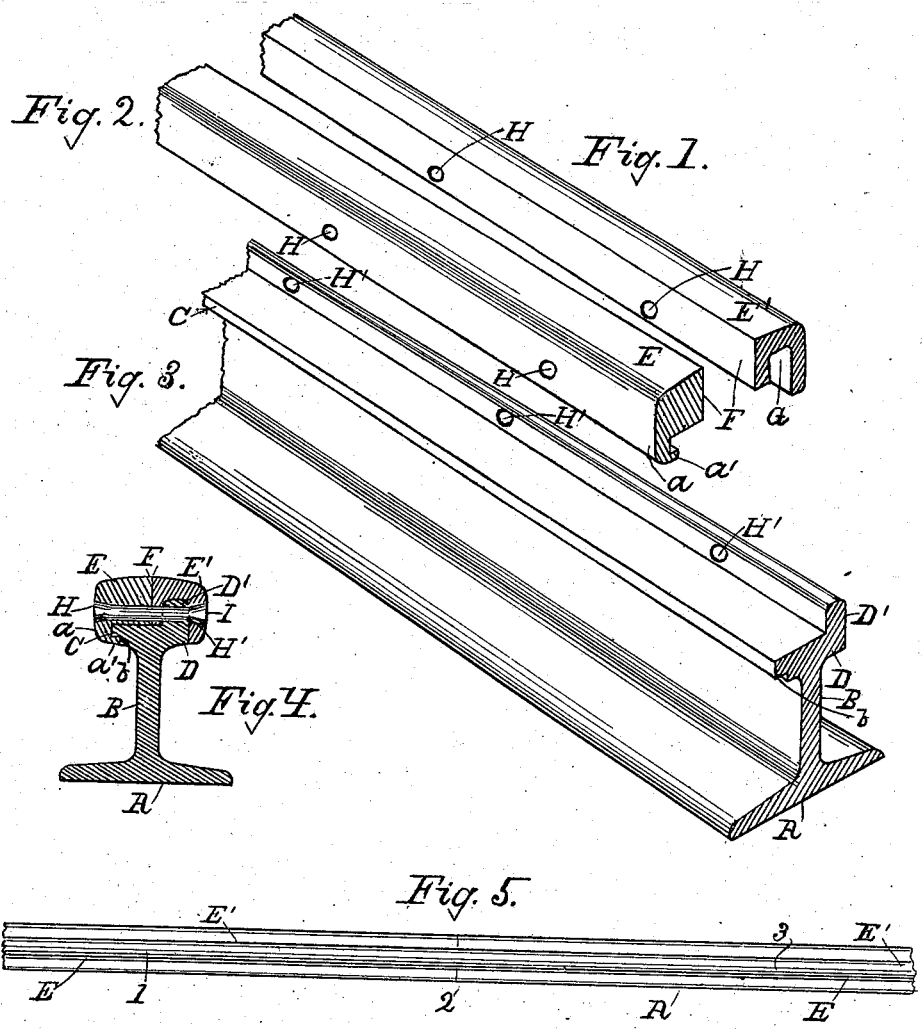

UNITED STATES PATENT OFFICE.

ALFRED P. FINLEY, OF SHERMAN, TEXAS.

COMPOUND RAILWAY-RAIL.

No. 881,313.　　Specification of Letters Patent.　　Patented March 10, 1908.

Application filed August 20, 1907.　Serial No. 389,333.

*To all whom it may concern:*

Be it known that I, ALFRED P. FINLEY, a citizen of the United States, residing at Sherman, in the county of Grayson and State of Texas, have invented certain new and useful Improvements in Compound Railway-Rails, of which the following is a specification.

My invention relates to rails which form tracks for locomotives, cars and similar wheeled vehicles, and has particular reference to that class styled compound or built-up rails, such as are composed of separate tread and base parts assembled and secured together to form a completed rail; its object being a construction and combination of elements designed to add to their solidity, safety and utility.

Other advantages naturally pertaining to a practical rail of this character will be obvious.

In the drawings forming a part of this specification, Figure 1 is a perspective of the outer half of the tread or bell portion of a rail; Fig. 2 is a perspective of the inner half of the tread or bell, and Fig. 3 a perspective elevation of the base and web portion, all shown separated but ready to be put together. Fig. 4 is a transverse vertical sectional view of the parts attached, showing particularly the novel features embodied in the same; and Fig. 5 represents a top plan of a rail constructed in conformity to my invention.

Referring to the lettered parts of the drawings, the rail base A and the web B comprise one part of the rail proper; they are of the usual form and construction except that the upper portion of the web is provided with laterally projecting ribs C D, the latter having an upwardly projecting flange D' all of which will be referred to specifically hereafter. The tread or bell is divided at the center longitudinally in a plane perpendicular to the plane of the tread, the latter being horizontal so that the tread is composed of two parts E E' both formed with inner vertical faces F that abut in the completed rail at the transverse center thereof. The tread portion E has a downward projection $a$ extending its whole length that terminates in a bend inwardly $a'$ forming a channel that conforms to the rib C and recess $b$ of the outer edge of the web rib. The tread portion E' has a centrally located channel or groove G on the bottom side thereof that extends throughout its length, which groove receives the web flange D' and the tread is thus secured against lateral displacement. The tread portions E E' are provided with perforations H and the flange D' with perforations H' in the same relative positions and equi-distant in all the tread parts and flange parts, and hence will all fit. Said perforations being somewhat enlarged on the outer sides of the tread parts as shown in Fig. 4. I are metal pins, preferably of round soft steel that fit the holes in tread parts E E' and flanges D' and when the tread portions are brought together and assembled as shown in Fig. 4 the pins I are inserted and riveted to swell their extremities to conformity with the perforations in the tread parts.

It will be understood that each rail proper will be composed of three principal parts, all equal in length when formed but not connected together with their ends in the same planes, as will be hereinafter explained.

Considered specifically in transverse section, the tread portions E E' have their inner vertical faces in a plane parallel to the web portion B as shown; when the faces of the two tread portions E E' are brought in contact the projection $a$ is adjacent to the rib C of the web and the flange D' is within the groove G and in position for securing; which is accomplished by inserting and swelling the pins I, thus forming a rigid and continuous rail that will effectually maintain the integrity of the track.

In laying the parts comprising the rail to form a track the joints of the several parts are staggered, as indicated in Fig. 5, 1 2 & 3 indicating joints. It will be seen that the contiguous ends of the tread parts E of the rails come between the ends of the parts E' of a base part of the rail, so that there is no separation of the base part at the point where the separation between the ends of the tread parts comes; and that the separation between the contiguous ends of the base part comes between the ends of a tread part, thus the joints between the respective tread and base parts alternate with each other in regular succession throughout the length of the track, making the rail continuous and strong and dispensing with fish-plates or splice-bars.

It will be noted that as there is comparatively no wear on the base and web portion which comprise about two thirds of the rail, that part will last indefinitely; and a new tread section being supplied when necessary makes the whole rail practically new and at slight cost when compared with the present plan of scrapping whole worn out rails.

Having thus described my invention, what I claim as new, and desire to secure by Letters Patent of the United States, is—

1. A compound railway-rail comprising a base and web portion, the web extending centrally from the base portion upwardly, terminating with laterally projecting ribs, one of which is flanged upwardly and perforated; a pair of tread portions, one being grooved to receive the flange portion of the web, the other channeled to receive the T web portion, and connecting devices for the flange and treads extending therethrough, substantially as and for the purpose described.

2. A compound railway-rail including a pair of tread portions perforated laterally at regular intervals and having inner opposing faces, one of the portions being grooved throughout its length, a base with a central web portion extending upwardly, terminating with laterally projecting ribs, one of which is flanged upwardly and the flange perforated at intervals, the groove in the tread portions adapted to receive and engage the flanged terminus and connecting devices extending through the treads and flange in a plane above the base, substantially as and for the purpose set forth.

3. In a railway-rail, the combination of a pair of tread portions one grooved throughout its length, the other channeled, the base portion having a central web portion that terminates in laterally projecting ribs, one being provided with an upwardly projecting flange and the other recessed, the treads resting upon the top of the ribbed web portion, and retaining pins extending through said treads and flange, substantially as and for the purposes shown and described.

In testimony whereof I affix my signature in presence of two witnesses.

ALFRED P. FINLEY.

Witnesses:
J. P. GEREN,
TOM D. NEWCOMB.